2,806,847
VINYLATION

John J. Nedwick, Philadelphia, Pa., assignor to Rohm & Haas Company, Philadelphia, Pa., a corporation of Delaware No Drawing. Application October 5, 1955, Serial No. 538,769

6 Claims. (Cl. 260—239.3)

This invention deals with a process for vinylating lactams efficiently and expeditiously.

In the preparation of N-vinylpyrrolidinone it has been the practice to pass acetylene gas under pressure usually diluted with nitrogen into pyrrolidinone and alkali metal catalyst at a reacting temperature between 100° and 150° C. The prior art methods require handling acetylene gas at elevated pressures and elevated temperatures. The serious hazards thus presented are decreased somewhat by diluting acetylene with an inert gas or vapors of a non-explosive volatile liquid. Reaction under these conditions is not rapid and gas must be recirculated or vapors recovered. There is thus required relatively large equipment for any given volume of production with apparatus for handling and recirculating considerable volumes of gas.

In the method of this invention acetylene gas is not handled at elevated temperatures, nor need it be diluted. The vinylation reaction can be directed to the desired type of product at a rapid rate with formation of few, if any, by-products, and the equipment needed for a given production is relatively small. These advantages are attained by passing acetylene into a liquid mixture containing a lactam having hydrogen on the nitrogen thereof and an alkali metal catalyst below about 30° C. until an amount of acetylene is dissolved in this mixture corresponding to the desired level of conversion to the desired N-vinyl compound, heating to a reacting temperature the resulting solution of a acetylene in the liquid mixture under a pressure sufficient to maintain this solution entirely in liquid phase, and separating the N-vinyl lactam.

The lactams which are preferably used for vinylation have the formula

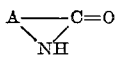

where A is an alkylene group of three to about ten carbon atoms with three to five carbon atoms connecting the —NH— and carbonyl groups. The preferred lactams thus contain from four to eleven total carbon atoms. There may thus be used pyrrolidinone, piperidone, or caprolactam or these heterocycles with C-substituents, as in 3-methyl pyrrolidinone, 4-methyl pyrrolidinone, 5-methyl pyrrolidinone, 3-ethyl pyrrolidinone, 3-butyl pyrrolidinone, 3,3-dimethyl pyrrolidinone, 4,5-dimethyl pyrrolidinone, 5,5-dimethyl pyrrolidinone, 3,3,5-trimethyl pyrrolidinone, 5-methyl-5-ethyl pyrrolidinone, 3,4,5-trimethyl-3-ethyl pyrrolidinone, 6-methyl-2-piperidone, 6-ethyl-2-piperidone, 3,5-dimethyl-2-piperidone, 4,4-dimethyl-2-piperidone, 6-propyl-2-piperidone, 3-octyl piperidone, 7-methyl caprolactam, 7-ethyl caprolactam, 4- or 5-isoproyl caprolactam, 4- or 5-butyl caprolactam, 4- or 5-tert-butyl caprolactam, 4- or 5-tert-octyl caprolactam, 4- or 5-tert-nonyl caprolactam, 3,7-dimethyl caprolactam, 3,5-dimethyl caprolactam, 4,6-dimethyl caprolactam, 3,5,7-trimethyl caprolactam, 2-methyl-4-isopropyl caprolactam, or 5-isopropyl-7-methyl caprolactam.

As catalysts, there are used strongly alkaline derivatives of the alkali metals sodium and potassium, including potassium hydroxide, or sodium hydroxide, these alkali metals themselves, the sodium and potassium salts of the lactams, the metal replacing the hydrogen on the nitrogen, or a sodium or potassium alkoxide, such as sodium methoxide, sodium ethoxide, potassium butoxide, or potassium ethoxyethoxide. The several latter types of catalysts may be prepared by dissolving an alkali metal in a lactam or in an alcohol and used in solution in an excess of these materials. Also, the alkali metal alkoxide itself may be supplied as catalyst.

It is interesting to note that commercial alkali metal hydroxides can be used here or even strong solutions thereof, as the reaction system need not be anhydrous. Thus the common 85% potassium hydroxide can be used and fairly good results can be obtained with 50% caustic.

The amount of catalyst taken will vary from about one-fourth mole percent to ten mole percent of the lactam. The preferred range is from one-half mole percent to five mole percent. When low temperatures of reaction are desired, there may be used relatively more catalyst and conversely relatively less catalyst can be used at higher reaction temperatures.

Where the lactam with catalyst remains liquid as temperatures are carried below 30° C., use of a solvent is not necessary, as the liquid lactam serves as a good solvent for acetylene. As acetylene is dissolved, the freezing point of the lactam mixture is lowered by it. Thus, for example, α-pyrrolidinone may be used without solvent with satisfactory conversions. Likewise, a normally solid lactam can be mixed with catalyst, the mixture melted and treated with acetylene. The mixture is cooled. As acetylene dissolves, the mixture remains liquid.

Where the lactam is a solid, sufficient solvent may be added to give a solution. Lower alkanols are particularly useful as solvents, even though they may form some vinyl ether, as does also the alkoxide portion of alkali metal alkoxides. This causes no difficulty, since the alkyl vinyl ethers are readily separated and are useful compounds in their own right.

A vinyl lactam may be used to give a fluid reaction mixture, thus avoiding the necessity of adding separate solvent. Hence, in recycling unreacted lactam, some vinyl lactam may be recycled with it.

There may also be used an acetylene solvent, such as dimethyl formal, diethyl formal, dimethyl acetal, diethyl acetal, dioxane, dioxolane, 2-methyl dioxolane, the monomethyl, dimethyl, monoethyl, diethyl, monopropyl, dipropyl and butyl ethers of ethylene glycol, diethylene glycol, triethylene glycol, or tetraethylene glycol, tetrahydrofuran, ethyl ether, isopropyl ether, and ethers in which a sulfur replaces oxygen as in $CH_3OCH_2CH_2SCH_2CH_2OCH_3$. Mixtures of two or more of such solvents or mixtures of such a solvent or solvents and a lower alkanol or a vinyl lactam may me used. Some of the acetylene solvents are also alcohols, and thus serve a dual purpose since they can be used to dissolve an alkali metal.

The amount of solvent may vary from zero up to 50% or more of the reaction mixture. Of course, the best efficiency is had when the amount of solvent is kept to a minimum for absorbing the required amount of acetylene and for maintaining the mixture fluid, even though not homogeneous, at lowest temperature of absorption.

The fluid reaction mixture comprising lactam and catalyst and solvent if used, is treated with acetylene at a temperature below about 30° C. The temperature used will be chosen with regard to the freezing point of the particular mixture in which acetylene is being dissolved and to the extent of conversion desired. The temperature of the mixture may be lowered progressively as acetylene is dissolved and temperatures even below 0° C., as down to −20° C., are sometimes desirable. Usually the temperatures of the mixture is between 0° and 25° C.

Acetylene is dissolved in the mixture under pressure, the pressure being sufficient to cause solution of the amount of acetylene at the temperatures employed to give the desired conversion. Pressures of acetylene up to 500 p. s. i. g. may be used. In handling acetylene under pressure the usual precautions are taken, except that dilution with gas or vapor is unnecessary at the absorbing temperatures used. Generally acetylene pressures from 100 to 450 p. s. i. g. are utilized.

The mixture charged with acetylene is passed in liquid phase through a heating zone, where the reaction mixture is heated to a reacting temperature from about 150° to 280° C., preferably 180° to 230° C., under pressure sufficient to maintain the liquid phase. This requires pressures from about 1000 to 5000 p. s. i. g. Residence time in the heating zone is from about 10 minutes to one-half minute. Longer times can be used, but usually without advantage. Usually, with a residence time of two to five minutes most of the acetylene will have reacted cleanly.

In a convenient form of apparatus the reaction mixture is passed under pressure through a heated coil. Reaction takes place with evolution of heat, which is dissipated and the temperature controlled within the desired limits. In this way of operating it can be observed with the aid of thermocouples that reaction is very rapid and becomes essentially complete within the above residence times.

The reaction mixture is now worked up to give the N-vinyl lactam. Pressure is released. If desired, the mixture may be degassed. The volatile portions are distilled off and the N-vinyl lactam may be purified.

If solvent is used, it can be recycled. Unreacted lactam and the residue containing catalyst can be recycled with addition of catalyst as needed, although from time to time at least portions of the residue must be withdrawn and replaced with fresh catalyst.

In the following examples, which are presented for purposes of illustration and not by way of limitation, additional details of procedure are presented. Parts are by weight unless otherwise designated.

*Example 1*

To 376 parts of butyl alcohol is added with stirring under a nitrogen atmosphere 13 parts of sodium metal. It reacts with the alcohol and when reaction is complete, there is added pyrrolidinone in an amount of 438 parts. This mixture is passed into an absorption vessel, where acetylene is pressed in. The mixture is cooled to 10° C. and the acetylene pressure is carried to 365 p. s. i. g. The mixture charged with acetylene is pumped under a pressure of 1500 pounds per square inch through an apparatus maintained at 190° C. A residence time of six minutes is used. The reaction mixture is taken from the apparatus with release of pressure. Any gas which forms is taken off. The liquid is then passed into a distilling apparatus which is heated under reduced pressure. The volatile materials are flash-distilled, the pressure being reduced to about 0.5 mm. and the pot temperature being carried to 120° C. The flash-distillate is then fractionally distilled. There is taken off at 55°–60° C./60 mm. a fraction consisting of butyl vinyl ether. At 91°–93° C./10 mm. there is obtained a fraction of N-vinyl pyrrolidinone. On the basis of the pyrrolidinone recovered the yield is 85%.

In a comparable way the charge of pyrrolidinone can be treated with more or less acetylene by lowering or raising the temperature and/or raising or lowering the pressure of acetylene. Reaction of acetylene and pyrrolidinone is rapid in each case. The amount of butyl alcohol may be varied. In fact with pyrrolidinone use of alcohol can be dispensed with. The charge of pyrrolidinone and catalyst is fluid at about 30° C. and takes up sufficient acetylene to give a conversion of about 40%. When pyrrolidinone and catalyst are cooled to 19° C. and charged with acetylene as above, a conversion of about 50% is readily attained.

*Example 2*

To 510 parts of pyrrolidinone is added 20 parts of 85% potassium hydroxide. The temperature of the mixture is raised to 40°–50° C. and the mixture is stirred until the potassium hydroxide has dissolved. The resulting solution is charged to a pressure vessel and acetylene is passed in until 80 parts have been absorbed. During this time the mixture is held at 29° C. The acetylene pressure is carried to 300 p. s. i. g. The mixture is now passed entirely as a liquid through a heated reaction zone maintained at 190° C. The pressure used is 1500 p. s. i. g. and the residence time is 2.8 minutes. The reaction mixture is cooled to 30° C. Any evolved gas is vented. The mixture is flash-distilled to dryness to a final pot temperature of 115° C. and a pressure of 0.3 mm. The flash-distillate is fractionally distilled through a packed column. There is obtained a fraction of 238 parts of N-vinyl pyrrolidinone, distilling at 71°–73° C./3 mm. and having a refractive index, $n_D^{25}$, of 1.5102. Unconverted pyrrolidinone comes over at 92°–94° C./1.5 mm. The conversion is 36% and the yield based on pyrrolidinone not recovered is 79%.

*Example 3*

To 510 parts of pyrrolidinone there is added with stirring 10 parts of 85% potassium hydroxide. The mixture is warmed to 50° C. until the potassium hydroxide is all dissolved. It is then charged to an absorber where it is saturated with acetylene at 300 p. s. i. g. with the mixture at 29° C. The liquid mixture is now passed under a pressure of 1600–1700 p. s. i. g. through a coil heated to 180° C. Residence time in the heated coil is 2.8 minutes. The reaction mixture is cooled, the pressure is released, and the mixture is flash-distilled under low pressure, the endpoint being 0.3 mm. and the pot temperature 115° C. The flash-distillate is resolved by fractional distillation. There is taken at 71°–72° C./3 mm. a fraction of 160 parts of N-vinyl pyrrolidinone. Conversion is 24% but yield on pyrrolidinone consumed is 81%.

*Example 4*

(a) The procedure of Example 3 is followed except that the residence time is increased to five minutes. Conversion is 29% and the yield is 86%.

(b) The above procedure is again followed but with use of 20 parts of 85% potassium hydroxide and a temperature about the coil of 190° C. Thermocouples along the coil show that the exothermic reaction raises the temperature 27° C. The conversion is 35.6% and yield 63%.

(c) The procedure is repeated as in (b) but with the temperature about the coil of 180° C. The exothermic reaction raises the temperature for a short time to 203° C. The conversion is 33.3% and yield is 72%.

(d) The procedure is repeated again but with the temperature about the coil held at 70° C. The rise in temperature is 5° C. but reaction is observed to continue for a longer time. Conversion is 23% and yield is 70%.

(e) The above procedure is followed but with 10 parts of potassium used as catalyst, with the temperature about the coil maintained at 180° C., and with the residence time five minutes. The rise in temperature where reaction is occurring is 7.5° C. The conversion is 29% and the yield is 79%.

(f) This procedure is repeated with 10 parts of potassium hydroxide as catalyst but with the temperature about the coil held at 190° C. and the residence time reduced to 2.7 minutes. Conversion is 30% and yield 80%.

(g) The same procedure is followed except the amount of 85% potassium hydroxide used is four parts, the temperature about the coil is 210° C., and the residence time is 2.8 minutes. The exothermic reaction raises the temperature locally to 228° C. Conversion is 28.5% and yield is 90% without correction for losses of pyrrolidinone.

(h) This procedure is followed with the use of 40 parts of 85% potassium hydroxide and a 150° C. temperature about the coil. Residence time is increased to nine minutes. Local rise in temperature is 2° C. Conversion is 20% and yield 50%.

(i) The same general procedure is followed except 20 parts of potassium hydroxide are used in the form of an aqueous 50% solution. The temperature about the coil is held at 180° C., the local rise in temperature is 9° C., and residence time is 2.6 minutes. Conversion is 17% while yield is 63%.

*Example 5*

To 220 parts of isopropyl alcohol under nitrogen there is added potassium metal in an amount of 7.8 parts. When all of the potassium has dissolved, there are added 75 parts of dimethoxyethane and 226 parts of epsilon-caprolactam. The mixture is placed in a pressure vessel and charged with acetylene until 68 parts have been taken up. The temperature of the mixture is 29°–31° C. and the final acetylene pressure is 240 p. s. i. g. This reaction mixture is passed through a heated reactor at 190° C. The pressure on the liquid is about 1400 p. s. i. g. and is sufficient to maintain the mixture in liquid phase. The residence time is 2.6 minutes. The reaction mixture is taken from the reactor through a relief valve and flash-distilled under reduced pressure. The temperature of the charge in the pot is carried to 150° C. and the pressure to 0.3 mm. The flash-distillate is then fractionally distilled through a column. At 64°–66° C./0.45 mm. a fraction of 141 parts of N-vinyl caprolactam is obtained. The conversion is 51%. Isopropyl alcohol is recovered together with a very small amount of isopropyl vinyl ether.

The product fraction gives the following analyses: vinyl group 7.3 milliequivalents per gram (theory 7.2 meq.), carbon 67.6% (theory 69.06%), hydrogen 8.2% (theory 7.9%), and nitrogen 10.0% (theory 10.07%).

In the same way there are charged 200 parts of isopropyl alcohol, in which 8 parts of potassium has been dissolved, 75 parts of dimethoxyethane, and 200 parts of piperidone. From the flash-distillate there is separated a fraction which consists of N-vinyl piperidone, distilling at 70°–72° C./2 mm.

*Example 6*

To 210 parts of isopropyl alcohol under nitrogen there is added with stirring 8 parts of potassium metal. When all of this metal has dissolved, there are added with stirring 100 parts of dimethoxyethane and 254 parts of 3,3,5-trimethyl pyrrolidinone. The solution is passed into an absorption vessel where acetylene under 210 p. s. i. g. is passed in while the mixture is held at 24° C. The amount of acetylene dissolved is 78 parts. This mixture is passed through a heated coil maintained at 190° C. The pressure on the liquid, about 1500 p. s. i. g., is ample to maintain the mixture entirely in liquid phase. The residence time in the coil is six minutes. The reaction mixture is taken from the heated coil, pressure is relieved, gas is taken off, and the mixture is flash-distilled to 120° C. at a minimum pressure of 0.3 mm. The flash-distillate is resolved by fractional distillation. At 54°–71° C. a fraction of 15 parts is taken which contains isopropyl vinyl ether and isopropyl alcohol. At 80°–82° C. a fraction of isopropyl alcohol and dimethoxyethane is taken amounting to 275 parts. At 50°–52° C./0.5 mm. there is obtained a fraction of 170 parts which is 1-vinyl-3,3,5-trimethyl pyrrolidinone. It has a density, $d_{20}^{20}$, of 0.9562 and a refractive index, $n_D^{25}$, of 1.4817.

By the same procedure there is reacted 3-methyl pyrrolidinone. There is obtained in good yield 1-vinyl-3-methyl pyrrolidinone, distilling at 86° C./10 mm. and having a density, $d_{20}^{20}$, of 0.9970 and a refractive index, $n_D^{25}$, of 1.4969.

In the same way 5,5-dimethyl-2-pyrrolidinone yields 1-vinyl-5,5-dimethyl-2-pyrrolidinone, which distills at 57°–60° C./0.2 mm. with a refractive index, $n_D^{25}$, of 1.4840.

*Example 7*

The procedure of Example 3 is followed with the exceptions that two parts are used of 85% potassium hydroxide and the coil is heated in a bath maintained at 250° C. The exothermic reaction is observed to raise the temperature of the reacting mixture about 266° C. Conversion is 30.2% and yield is 86%.

In place of these alkyl substituted lactams there may be used other C-substituents such as listed above with like result. Since the procedures are essentially the same as those already described in detail, and since the products have the same general properties, further description is scarcely called for.

The N-vinyl lactams yield valuable polymers. They may be polymerized alone to give soluble homopolymers of known utilities. They may be copolymerized with other polymerizable vinylidene compounds for use in coatings, textile finishes, paper coatings, oil additives, synthetic fibers and films, molding powders, castings, and so on. The monomeric N-vinyl lactams are useful as solvents, as for example, for dissolving chemical compounds which are herbicides to prepare useful solutions thereof for dispersing in aqueous sprays.

I claim:

1. A process for vinylating lactams which comprises saturating a liquid mixture containing a lactam having hydrogen on the nitrogen thereof and an alkali metal catalyst based on the metals sodium and potassium with acetylene under pressure below about 30° C., the pressure being between 100 and 500 pounds per square inch and sufficient to dissolve in the reaction mixture an amount of acetylene to provide a conversion of at least 20% of the lactam, heating the resulting mixture at a reacting temperature between 150° and 280° C. under a pressure between 1000 and 5000 pounds per square inch and sufficient to maintain the mixture entirely in liquid phase, and separating an N-vinyl lactam.

2. A process for vinylating lactams of four to eleven carbon atoms which comprises dissolving acetylene in a liquid mixture containing a lactam having hydrogen on the nitrogen thereof and an alkali metal catalyst based on the metals sodium and potassium below about 30° C. and under a pressure from 100 to 500 p. s. i. g. sufficient to dissolve an amount of acetylene which is equivalent to about 20% to about 50% of the lactam, heating the resulting mixture at a reacting temperature between 150° and 280° C. under a pressure from about 1000 to 5000 p. s. i. g. and sufficient to maintain the mixture entirely in liquid phase, and separating the N-vinyl lactam.

3. A process for vinylating lactams which comprises dissolving acetylene under pressure from 100 to 500 p. s. i. g. in a fluid mixture containing an alkali metal catalyst based on the metals sodium and potassium and a lactam of the formula

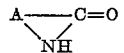

wherein A is an alkylene group of three to ten carbon atoms with three to five of these between the —NH— and the carbonyl groups at a temperature from 30° to —20° C., the amount of acetylene dissolved being equivalent to about 20% to about 50% of the lactam, heating the resulting mixture at a reacting temperature between 150° and 280° C. under a pressure from 1000 to 5000 p. s. i. g. and sufficient to maintain the mixture entirely in liquid phase, and separating the N-vinyl lactam.

4. A process according to claim 3, wherein the fluid mixture also contains a lower alkanol.

5. A process for preparing N-vinyl pyrrolidinone which comprises dissolving acetylene under pressure from 100 to 500 p. s. i. g. in a fluid mixture containing an alkali metal catalyst based on the metals sodium and potassium and pyrrolidinone at a temperature below about 30° C., the amount of acetylene dissolved being equivalent to about 20% to about 50% of the pyrrolidinone, heating the resulting mixture at a reacting temperature between 150° and 280° C. under a pressure from about 1000 to 5000 p. s. i. g. and sufficient to maintain the mixture entirely in liquid phase, and separating N-vinyl pyrrolidinone.

6. A process for preparing N-vinyl caprolactam which comprises dissolving acetylene under pressure from 100 to 500 p. s. i. g. in a fluid mixture containing an alkali metal catalyst based on the metals sodium and potassium, epsilon-caprolactam, and a lower alkanol at a temperature from 30° to —20° C., the amount of acetylene dissolved being equivalent to at least 20% of the epsilon-caprolactam, heating the resulting mixture at a reacting temperature between 150° and 280° C. under a pressure from 1000 to 5000 p. s. i. g. and sufficient to maintain the mixture entirely in liquid phase, and separating N-vinyl caprolactam.

References Cited in the file of this patent

UNITED STATES PATENTS 2,317,864  Reppe et al. _____ Apr. 27, 1943